May 3, 1932.  H. W. SHAW  1,856,932

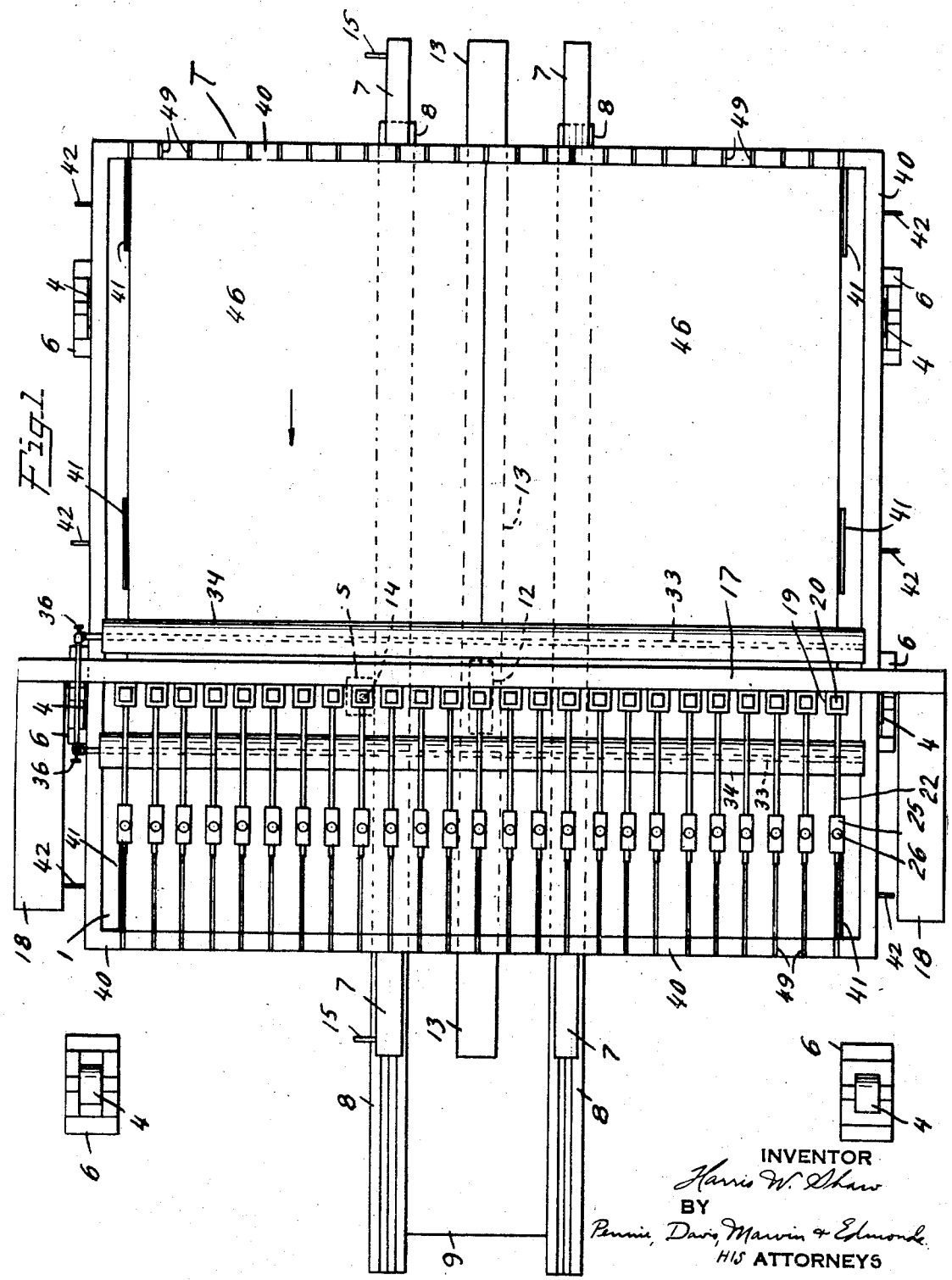

METHOD AND APPARATUS FOR MAKING PLASTER BOARD

Filed Oct. 1, 1929   3 Sheets-Sheet 2

INVENTOR
Harris W. Shaw
BY
Pennie, Davis, Marvin & Edmonds
HIS ATTORNEYS

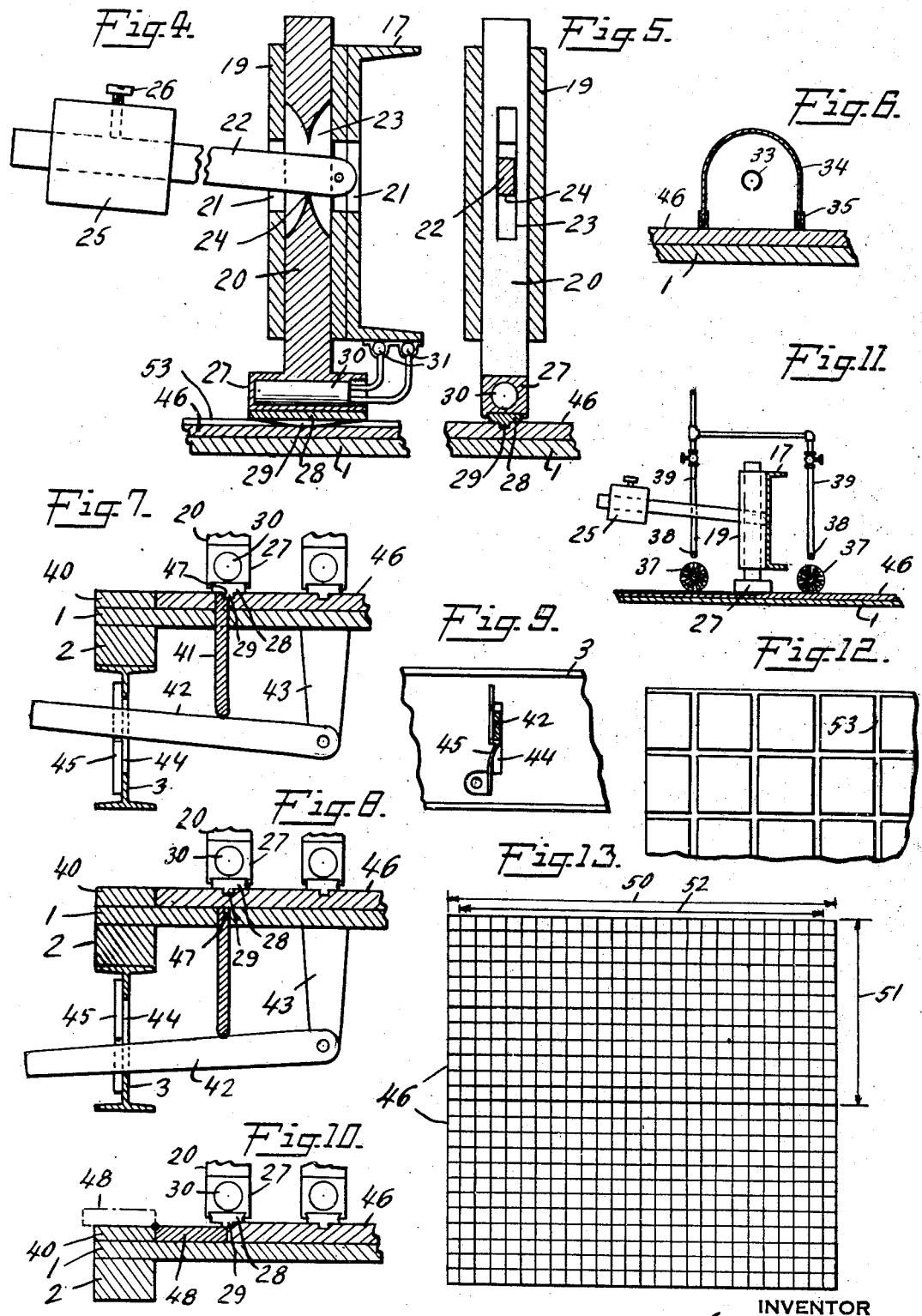

Patented May 3, 1932

1,856,932

UNITED STATES PATENT OFFICE

HARRIS W. SHAW, OF WILLIAMSVILLE, NEW YORK, ASSIGNOR TO NATIONAL GYPSUM COMPANY, OF BUFFALO, NEW YORK, A CORPORATION OF DELAWARE

METHOD AND APPARATUS FOR MAKING PLASTER BOARD

Application filed October 1, 1929. Serial No. 396,482.

This invention relates to a manufacture of plaster board, and more particularly concerns improved apparatus for forming the surface of a plaster board to resemble a composite surface of tile, brick or other separate blocks or elements. The invention further includes an improved method of forming a board of this nature.

In the construction of modern dwellings and in the building arts generally, a considerable demand has arisen for a wall, floor, ceiling or partition slab or covering which has the appearance of a composite tile or brick construction. Boards formed of gypsum plaster and generally known as wall boards or plaster boards are extensively employed in building constructions, and it is therefore desirable that such materials be formed to resemble tiled or other composite surfaces. Due to the construction of the plaster boards and to the properties of the materials from which they are formed, considerable difficulty has been encountered in forming the surfaces thereof to resemble tiled constructions, and previous attempts to so form plaster boards has been unsuccessful for various reasons.

In the manufacture of plaster board, a suitable gypsum plaster is usually enclosed within a pair of paper cover sheets and pressed or squeezed to the required thickness by suitable apparatus. Due to the fact that the plaster is necessarily in a semifluid or plastic state during the forming operation, this material has a tendency to slip or run between the cover sheets, and even when the pressing operation is carried out with the utmost care and with the most modern apparatus, the thickness of the finished board is nonuniform and the surfaces thereof are slightly waved. Due to the above described irregularities in the surfaces of the plaster boards, a series of grooves or depressions cannot be readily formed thereon by the usual means, as such grooves would be of irregular depths corresponding to the surface irregularities of the board. Further, the gypsum plaster as well as the cover sheets of which many plaster boards are formed is very brittle, and when grooves or other impressions are pressed into the surfaces of such boards, the core and the cover sheets are frequently cracked, or weakened to such an extent as to be rendered unfit for use.

In accordance with the present invention, it is proposed to provide improved apparatus for impressing a plurality of crossed parallel grooves or depressions on the surface of a plaster board, such grooves being formed to represent the joints between adjacent tiles, bricks or other blocks. It is further proposed to provide groove forming apparatus including means for moistening and heating the surface of the board to facilitate the impression of grooves therein.

It is a further object of the invention to provide simplified apparatus for supporting and handling the plaster board while the grooves are being impressed therein.

The invention also includes an improved method of forming permanent grooves of uniform depth in the plaster board.

Various other specific objects, advantages and characteristic features of the invention will become apparent as the description thereof progresses.

In general, the method of the present invention is carried out in the following manner. One or more plaster or wall boards, each comprising a plastic core having a heavy paper cover sheet on at least one surface thereof is placed upon a movable table and carried thereon beneath a plurality of vertically movable grooving tools. After one set of grooves has thus been formed, the board or boards are turned through the desired angle, fixed upon the table and again passed beneath the grooving tools whereby a second set of grooves, intersecting the first set, is impressed. Just before each grooving operation, it is preferred to slightly moisten and heat the cover sheet of the board by suitable means, and the grooving tools are preferably heated to facilitate the impression of grooves in the board surfaces.

The apparatus of the invention includes a horizontally movable table provided with means for holding one or more plaster boards on the upper surface thereof. The board engaging means on the table are preferably adjustable so that boards of greater length than width may be retained in position when placed either lengthwise or crosswise of the table. The grooving tools are secured to a suitable support in such a manner that they are independently movable vertically, and each tool is provided with suitable means for pressing it against the surface of the board. Individual heating elements are preferably provided for the several tools, and according to one embodiment of the invention, means are provided on either side of the grooving tools for evenly distributing a moistening fluid over the surface of the board just before it passes under the tools.

In describing the invention in detail, reference will be made to the accompanying drawings, wherein a typical embodiment of the apparatus of the present invention has been illustrated. In the drawings;

Figure 1 is a plan view of a plaster board grooving apparatus embodying the invention;

Fig. 2 is a sectional elevation of the apparatus shown in Fig. 1;

Fig. 3 is an end view, partly in section, of the apparatus shown in Fig. 1;

Fig. 4 is an enlarged sectional side view of one of the groove forming tools together with its supporting means;

Fig. 5 is a sectional end view of the tool shown in Fig. 4;

Fig. 6 is a sectional view of one form of board moistening means employed in connection with the apparatus of the invention;

Fig. 7 is a sectional view of the board retaining means on the movable table;

Fig. 8 is a view similar to Fig. 7 showing the board retaining means in different position of operation;

Fig. 9 is a side view of the operating mechanism of the board retaining means shown in Figs. 7 and 8;

Fig. 10 is a sectional view of a modified form of board retaining means;

Fig. 11 is a side view of a modified form of board moistening means;

Fig. 12 is an enlarged plan view of a portion of a plaster board grooved by the apparatus of the present invention; and Fig. 13 is a plan view of two boards in the relative positions which they occupy during the grooving operation.

Referring to the drawings, and particularly to Figs. 1, 2 and 3, the disclosed embodiment of the apparatus includes a horizontally movable table T which may be formed by a table plate 1 reinforced by marginal members 2 and fixed to suitable supports such as the I-beams 3. The I-beams preferably rest on stationary anti-friction rollers 4 carried by suitable base structures 6. The table T is guided in its horizontal movement and supported at its central portion by a pair of longitudinal tongued guides 7 fixed to the lower surface of the plate 1 and resting in the grooves of a pair of rails 8 fixed to the base structure 9.

The table T may be moved on the above described supporting means by any suitable mechanism. In the disclosed embodiment, an electric motor M is employed for this purpose, being operatively connected to the table T through a belt 10, a reduction gear train 11, a pinion 12 and a rack 13, as clearly shown in Fig. 3. The distance of travel of the table T in either direction is preferably limited by suitable means, such as a motor control switch operated by the movement of the table. Since the particular motor control means forms no part of the present invention, and since various types of apparatus suitable for accomplishing this end are well known, the motor control means has been illustrated in a diagrammatic manner only. A switch S having an operating lever 14 is shown fixed to one of the stationary rails 8, and a pair of pins 15 for engaging and operating the lever 14 are fixed at opposite ends of the movable guides 7. The switch S may be interposed in an electric circuit between a source of power P and the motor M, and a manually operable switch 16 is preferably connected to the automatic switch S. The switch S may be arranged to open the motor circuit upon the movement of the lever 14 by one of the pins 15 as the table T reaches the end of its run in either direction, the motor being subsequently reversed and started to move the table in the opposite direction by means of the manual switch 16.

A stationary tool head or bridge 17 extends across and substantially parallel to the table T at the mid-point of its longitudinal travel, this head being carried by suitable rigid supports 18. A plurality of parallel vertically disposed tool guides 19 are fixed to the heads 17 at equally spaced points across the table as shown in Figs. 1, 2 and 3. Each of the tool guides 19 is provided with a vertically open bore of suitable section within which a grooving tool 20 is slidably disposed. As shown in Figs. 4 and 5, each tool guide 19 has a pair of aligned slots 21 in the opposite side walls thereof, and a floating lever 22 passes through these slots, being pivotally secured to the guide 19 within one slot and extending through the other slot to a considerable distance beyond the guide. Each lever 22 passes through an opening 23 in the corresponding tool 20 and rests on a knife edge 24 in this opening, as shown in Fig. 4. A suitable weight 25 is slidably secured to the outwardly extending portion of each lever 22 whereby an adjustable downward pressure is exerted on the corresponding tool 20. A set screw 26 is preferably provided to maintain each weight 25 in its adjusted position on the lever 22.

The lower end of each grooving tool 20 is provided with an enlarged foot portion 27 having a grooving shoe or working face 28 secured to its lower surface. The shoes 28 are preferably formed of a non-corrosive substance such as Monel metal, and are formed to present a contour which is the reverse of the shape of indentation or groove desired in the plaster board. In the disclosed embodiment of the present invention, the apparatus is designed to impress rectangular grooves in the board surface, and accordingly, each of the shoes 28 is provided with a downwardly protruding rectangular groove-forming rib 29, these ribs being suitably tapered at their ends to facilitate the grooving operation.

The enlarged foot portion 27 of each tool 20 is preferably provided with heating means, and in the disclosed embodiment these means comprise electric heating units 30 of the cartridge type enclosed within cylindrical cavities in the shoes 28. The current for generating heat in these units may be conveniently supplied from a suitable source through cables 31 carried by the tool head 17 as shown in Fig. 4.

Means are preferably provided for moistening and heating the surface of the board just prior to the grooving operation. According to one embodiment of the invention, this object is accomplished by exposing the board surface to an atmosphere of live steam just before the surface passes under the grooving tools 20. A pair of steam pipes 33 are respectively supported on opposite sides of the tool head 17 at points adjacent the table T, each pipe extending across the table at right angles to the direction of travel thereof, and a hood 34 encloses each pipe and confines the steam to the surface of the board. The lower edges of the hoods 34 are preferably provided with sealing flaps 35 of suitable flexible material for engaging the surface of the boards and preventing the escape of steam from the hoods. The steam for the described moistening means may be supplied from a suitable source through the pipes 33, and cut-off valves 36 are preferably provided for selectively controlling the admission of steam to the hoods 34.

A modified form of moistening apparatus is shown in Fig. 11. According to this modification, two felt covered rollers 37 are respectively rotatably supported on opposite sides of the tool head 17, each of these rollers extending across the entire width of the table T in a position to lightly engage the surface of a board carried on the table. A spray pipe 38 having a plurality of perforations along the lower surface thereof is mounted above each of the rollers 37, and hot water is supplied to each spray pipe 38 through a valve controlled pipe 39. The hot water which falls upon the rollers 37 from the pipes 38 is evenly distributed by the rollers 37 over the surface of a board carried on the table T.

Referring now more particularly to the means employed for retaining the plaster boards in position on the surface of the table T, according to one embodiment of the invention, a marginal retaining extension 40 is fixed to or formed integrally with the upper surface of the plate 1 near its edges, this extension completely surrounding the board-carrying central portion of the plate. The end portions of the extension 40 are preferably provided with a plurality of grooves 49 to accommodate the grooving extensions 29 of the tools 20.

Most plaster boards are cut from a continuous slab having finished side edges, the individual boards being slightly more than twice as long as the width of the slab from which they are cut. Boards of these general dimensions are usually trimmed at their ends to a length equal to just twice their width. The extensions 40 on the table T are designed to accommodate two or more plaster boards when placed transversely of the table, that is, with their longest dimensions at right angles with the direction of travel of the table. After a set of parallel grooves have been impressed on the boards in this position, they are turned through an angle of 90° and placed side-by-side with their longest dimension extending longitudinally of the table. Since the shortest dimension of the untrimmed boards is less than one-half of the longer dimension, two boards placed side-by-side and extending longitudinally of the table do not completely bridge the gap between the side edge extensions 40.

In the embodiment of the invention shown in Figs. 1, 3, 7 and 8, the above described change in width of board surface to be accommodated on the table T is taken care of by providing a plurality of movable guides 41 which are slidably mounted in longitudinal slots at points near the edge of the table. Each guide 41 is supported by an operating lever 42 which is pivotally secured to an extension 43 on the lower face of the table plate 1, the free end of the lever extending outwardly through an opening 44 in the I-beam 3 beneath the edge of the table T. A spring catch 45 is provided adjacent the opening 44 and is arranged to releasably maintain the lever 42 in a raised position as shown in Figs. 7 and 9. When the levers 42 are so raised, the guides 41 are lifted to such a position that their upper ends extend above the surface of the plate 1 a distance equal to the thickness of the plaster board 46 carried on the table. The upper end of each guide 41 is preferably grooved as shown at 47 to permit the outer grooving tool 20 to impress half a groove along the finished side edge of the board, as shown in Fig. 7. The guides 41 on opposite sides of the table T are so spaced as to accommodate a whole number of plaster boards when placed longitudinally of the table with their finished edges in contact with the guides. When the guides 41 are lowered below the surface of the plate 1, as shown in Fig. 8, the distance between the side extensions 40 is just sufficient to accommodate an untrimmed board placed transversely of the table.

A modified form of guide for accommodating the two widths of plaster board surface on the table T is shown in Fig. 10. According to this modification, a guide plate 48 is hinged to each of the side extensions 40 and is arranged to be swung inwardly against the surface of the table plate 1, to accommodate the plaster boards 46 when placed lengthwise of the table. When the plaster boards are placed transversely of the table, the guide plates 48 are swung back to the position shown in broken lines in Fig. 8 and the ends of the boards engage the side extensions 40.

The operation of the board grooving apparatus is as follows. The plaster boards 46 which are to be grooved, are first placed upon the table T with their longest dimension parallel to the direction of movement to the table as shown in Fig. 1. Although the table may be designed to accommodate any desired number of plaster boards of any desired size, the operation will be described in connection with a table designed to accommodate two boards, each substantially 8 feet, 6 inches long by 4 feet wide before being trimmed. The guides 41 are raised by levers 42 and the two boards are held between these guides in parallel aligned relation on the table. The heating units 30 of the grooving tools 20 are then energized and steam is admitted to the hood 34 on the side of the tool head from which the boards are advanced. The motor M is started and the table T moves beneath the tools 20. The tools 20, which are individually depressed by the weights 25, impress parallel grooves in the surfaces of the boards, these surfaces having been first moistened by steam from the hoods 34. After the table T has passed completely beneath the grooving tools 20, the motor is stopped by the automatic switch S which is operated as explained above by a pin 15 moving with the table T. The guides 41 are then lowered to the position shown in Fig. 8 and the plaster boards 46 are turned through an angle of 90° and placed crosswise of the table with the long edge of one board in contact with the grooved end extension 40 remote from the tool head 17. The motor M is again started and the boards are passed in the opposite direction beneath the tools 20, the surfaces of the boards being moistened by steam from the hood 34 before passing under the tools. In this manner a second set of parallel grooves, intersecting the first set at substantially right angles, is formed on the surfaces of the two plaster boards, the intersecting grooves giving the surface of the boards a tiled appearance.

As shown in Fig. 7, the end grooving tool 20 is arranged to impress half a groove along the finished side edges of the plaster board when placed longitudinally of the table T. When the boards are placed crosswise of the table, this end tool forms a groove, the center of which is substantially 3 inches from the end of the plaster board. After the grooved boards are removed from the table T, their ends are preferably trimmed back to the center of the first groove, so that the end edges as well as the side edges are provided with half grooves resembling the termination of a row of tiles. This grooving and trimming of the plaster boards is generally illustrated in Fig. 13 wherein two plaster boards 46 having an untrimmed length 50 equal to substantially 6 inches more than twice their width 51 are disclosed. As shown in Fig. 13, the last transverse groove adjacent the ends of the boards 46 is removed from the end edges of the boards a distance equal to one-half the distance between adjacent grooves on the board surface. That portion of the ends of the boards lying beyond these end grooves is trimmed off, reducing the board to a length represented by the line 52, equal to twice the width 51 of the boards.

The slidable arrangement of the mounting means for the grooving tools 20 permits the independent vertical movement thereof during the operation of the apparatus, and for this reason, grooves of uniform depth are impressed on the surface of the boards regardless of the irregularities in these surfaces. The application of moistening fluid to the board surface just prior to the grooving operation slightly softens the surface and thus permits the impression of sharply defined and permanent grooves. The heated working faces 28 of the grooving tools 20 iron the grooves smoothly into the board surface and produce a finished groove 53 of neat appearance.

The procedure followed in forming the grooves on the plaster boards may be varied in many ways. For example, the table T may be moved through both a forward and reverse stroke while the boards are placed transversely of the table whereby the resistance to the grooving tools offered by the grain of the paper cover sheets of the boards may be overcome. It should be further understood that either the transverse or the longitudinal grooves may be impressed first, as desired, and various other changes in procedure may be made without departing from the scope of the invention as defined by the appended claims.

I claim:

1. A method of forming a plurality of grooves in the surface of a plaster board which comprises moistening the surface of the board and passing the moistened surface beneath a plurality of heated grooving tools.

2. A method of forming a plurality of intersecting grooves in the surface of a plaster board which comprises moistening the surface of the board, passing the moistened surface beneath a plurality of grooving tools, rotating the board through an angle of substantially 90°, again moistening the surface of the board and again passing the board beneath the grooving tools.

3. Apparatus for forming a plurality of parallel grooves on a surface comprising a plurality of spaced grooving tools, a plurality of spaced guides respectively engaging said tools and permitting the independent vertical movement of said tools, independent means for pressing each of said tools downwardly in its guide and means for moving a surface beneath said tools.

4. Apparatus for forming a plurality of parallel grooves on a surface comprising a plurality of spaced grooving tools each having a downwardly projecting tapered grooving rib on the lower surface thereof, a plurality of stationary guides for respectively supporting said tools, said tools being slidable vertically in said guides, means for independently pressing each of said tools downwardly in its guide, and means for moving a surface beneath said tools.

5. Apparatus for forming a plurality of parallel grooves on a surface comprising a plurality of grooving tools, a plurality of spaced stationary guides for maintaining said tools in parallel relation, means for individually heating said tools, means for pressing each of said tools downwardly and means for moving a surface beneath said tools.

6. Apparatus for forming a plurality of parallel grooves on a surface comprising a plurality of spaced grooving tools each having a downwardly projecting tapered grooving rib on the lower surface thereof, means for supporting said tools, means for heating said tools, means for independently pressing each of said tools downwardly, and means for moving a surface beneath said tools.

7. Apparatus for forming a plurality of parallel grooves on a surface comprising a horizontally movable table, a plurality of grooving tools supported above said table in parallel relation, means for independently pressing said tools downwardly toward the table, means for moistening a surface carried by said table, and means for moving said table beneath said tools.

8. Apparatus for forming a plurality of parallel grooves on a surface comprising a horizontally movable table, a plurality of parallel vertically slidable grooving tools disposed above said table, means for independently pressing each of said tools toward said table, means adjacent said tools for applying a moistening fluid to a surface on said table and means for moving said table beneath said tools.

9. Apparatus for forming a plurality of parallel grooves on a surface comprising a horizontally movable table, a stationary tool head extending across the surface of said table, a plurality of grooving tools carried by said tool head and independently vertically movable with respect thereto, means for independently pressing each of said tools toward the surface of said table, means for applying a moistening fluid to a surface carried on said table, and means for moving said table beneath said tools.

10. Apparatus for grooving a surface comprising a horizontally movable table for carrying the surface to be grooved, a stationary tool head extending across said table, a plurality of spaced vertical guides fixed to said tool head, a grooving tool carried by each of said guides and vertically slidable therein, means for independently pressing each of said grooving tools downwardly in its guide, means for heating said grooving tools, means adjacent said tool head for applying a moistening fluid to a surface on said table and means for moving said table beneath said tools.

11. Apparatus for forming a plurality of intersecting sets of parallel grooves in a surface comprising a horizontally movable table, a plurality of parallel vertically slidable grooving tools mounted above said table, means for independently pressing each of said tools toward said table, means on said table for carrying a surface in either one of two angularly displaced positions, and means for moving said table beneath said tools.

12. Apparatus for forming a plurality of intersecting sets of parallel grooves in a surface comprising a horizontally movable table, a plurality of grooving tools mounted above said table, means for pressing said tools toward the surface of said table, means for moving said table beneath said tools, fixed means along opposite edges of said table for retaining a surface of a given width in position on said table and movable guides adjacent said fixed means for at times retaining a surface of lesser width in position on said table.

13. Apparatus for forming a plurality of parallel grooves on the surface of a plaster board comprising a horizontally movable table, means for retaining at least one plaster board on the surface of said table, a plurality of grooving tools mounted above said table, means for pressing said tools toward the surface of said table, a stationary hood extending across the surface of said table adjacent said grooving tools and having a downwardly disposed opening therein, means for applying a moistening fluid to the interior of said hood and means for moving said table beneath said hood and said tools.

14. Apparatus for forming a plurality of parallel grooves on the surface of a plaster board comprising a horizontally movable table, means for retaining at least one plaster board on the surface of said table, a stationary tool head extending across said table, a plurality of spaced grooving tools carried by said head and independently vertically movable with respect thereto, means for independently pressing each of said tools toward the surface of said table, means for heating said tools, a stationary hood extending across the surface of said table adjacent said tool head and having a downwardly disposed opening therein, means for supplying a moistening fluid to said hood and means for moving said table in either direction beneath said hood and said tools.

In testimony whereof I affix my signature.

HARRIS W. SHAW.